(12) United States Patent
Urano et al.

(10) Patent No.: US 8,115,353 B2
(45) Date of Patent: Feb. 14, 2012

(54) CONNECTION LINE USED FOR STATOR OF ELECTRIC MOTOR, STATOR INCLUDING THAT CONNECTION LINE, AND METHOD FOR BENDING THE CONNECTION LINE

(75) Inventors: Hiroaki Urano, Nishikamo-gun (JP);
Kazutaka Tatematsu, Nagoya (JP);
Yasuji Taketsuna, Okazaki (JP);
Yasushi Nishikuma, Toyota (JP);
Yutaka Komatsu, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 251 days.

(21) Appl. No.: 12/669,435

(22) PCT Filed: Jul. 17, 2008

(86) PCT No.: PCT/JP2008/063337
§ 371 (c)(1),
(2), (4) Date: Jan. 15, 2010

(87) PCT Pub. No.: WO2009/011459
PCT Pub. Date: Jan. 22, 2009

(65) Prior Publication Data
US 2010/0201212 A1    Aug. 12, 2010

(30) Foreign Application Priority Data
Jul. 19, 2007  (JP) .................................. 2007-188468

(51) Int. Cl.
*H02K 11/00* (2006.01)
*H02K 3/50* (2006.01)

(52) U.S. Cl. ......................................................... 310/71
(58) Field of Classification Search .................... 310/71, 310/179, 180, 194, 260; H02K 3/50, 3/52, H02K 5/22
See application file for complete search history.

(56) References Cited

U.S. PATENT DOCUMENTS

| 6,914,356 B2 * | 7/2005 | Yamamura et al. ............. 310/71 |
| 7,091,645 B2 * | 8/2006 | Yoneda et al. ................. 310/208 |
| 7,930,818 B2 * | 4/2011 | Hirao ............................... 29/605 |
| 2002/0084713 A1 | 7/2002 | Kuroyanagi |
| 2004/0000830 A1 | 1/2004 | Gomyo et al. |

(Continued)

FOREIGN PATENT DOCUMENTS
CA    2 349 237 A1    5/2000
(Continued)

OTHER PUBLICATIONS

German Office Action dated Sep. 21, 2011, received in Corresponding German Application No. 11 2008 001 909.6.

*Primary Examiner* — Quyen Leung
*Assistant Examiner* — Thomas Truong
(74) *Attorney, Agent, or Firm* — Sughrue Mion, PLLC

(57) ABSTRACT

A connection line has a first bent portion bent toward a coil's main body in a vicinity of a stator core's axial length limit line. Furthermore, the connection line at a portion closer to the coil's main body than the first bent portion has a second bent portion bent away from the coil's main body. Furthermore, the connection line has a third bent portion bent away from the coil's main body to have a connection portion along an end surface of the terminal member in contact therewith generally parallel thereto.

5 Claims, 4 Drawing Sheets

U.S. PATENT DOCUMENTS

| | | |
|---|---|---|
| 2004/0051410 A1 | 3/2004 | Miya et al. |
| 2006/0043806 A1* | 3/2006 | Torii et al. ........................ 310/71 |
| 2009/0108688 A1* | 4/2009 | Miura ............................ 310/71 |

FOREIGN PATENT DOCUMENTS

| | | |
|---|---|---|
| DE | 282738 | 10/1913 |
| DE | 31 48 902 A1 | 6/1983 |
| JP | 2001-103700 A | 4/2001 |
| JP | 2002-199644 A | 7/2002 |
| JP | 2002-530039 A | 9/2002 |
| JP | 2003-134758 A | 5/2003 |
| JP | 2003-134759 A | 5/2003 |
| JP | 2003-324886 A | 11/2003 |
| JP | 2004-215329 A | 7/2004 |
| JP | 2006-187164 A | 7/2006 |

* cited by examiner

CONNECTION LINE USED FOR STATOR OF ELECTRIC MOTOR, STATOR INCLUDING THAT CONNECTION LINE, AND METHOD FOR BENDING THE CONNECTION LINE

TECHNICAL FIELD

The present invention relates generally to connection lines used for stators of electric motors, and particularly to connection lines connecting a coil wound on a stator core to a terminal member provided radially outer than the coil as seen from the center of the core.

BACKGROUND ART

An electric motor used as a source for driving an electric vehicle or the like normally has a stator core in the form of a ring having a plurality of radially inwardly projecting teeth circumferentially with fixed intervals. The stator core has each tooth with a coil wound thereon. Such stator is fabricated by previously winding a coil in accordance with each tooth's geometry to provide a unit of coil and fitting each unit of coil on a tooth to facilitate assembling the stator. This, however, requires that after each unit of coil is fit on a tooth, predetermined coils be electrically connected together, and the operation connecting them together is cumbersome. This problem is resolved, for example as disclosed in Japanese Patent Laying-open No. 2001-103700.

Japanese Patent Laying-open No. 2001-103700 discloses a stator for an electric motor, that includes a stator core in the form of a ring having a plurality of inwardly projecting teeth circumferentially and equally spaced, coil units each fit on a tooth of the stator core and formed of a conductor previously wound to have each coil such that its starting end of winding and its finishing end of winding extend radially outward along an end surface of the stator core, cylindrical terminal members provided radially outer than the stator core and receiving each coil's starting and finishing ends, respectively, of winding when each coil unit is fit on a tooth, and a bus bar connecting the terminal members together.

Japanese Patent Laying-open No. 2001-103700 discloses that when the coil units are fit on the teeth of the stator core, each coil's starting and finishing ends of winding are inserted in the cylindrical terminal members, respectively. This can facilitate an operation connecting the coil to the terminal members (i.e., coils together).

In the stator disclosed in Japanese Patent Laying-open No. 2001-103700 when a coil unit is fit the coil has an end inserted in a terminal member, and to do so, the coil has the end bent generally perpendicularly toward the terminal member. One such method of bending a coil is to form a tool in accordance with a required angle for plastic deformation, insert the tool between the coil's main body and the coil's end, and press the coil's end against the tool. If there is a short distance between the coil's main body and a position at which the coil's end is bent, however, a sufficient space cannot be ensured for the tool, and for some material, diameter, cross section and the like of the coil, the coil's end may not be bent to have a required angle. However, Japanese Patent Laying-open No. 2001-103700 does not disclose any technique for resolving such a problem.

DISCLOSURE OF THE INVENTION

The present invention has been made to overcome the above issue, and it contemplates a connection line used for a stator used for an electric motor and including a stator core, a coil provided at the stator core's inner circumferential side, and a terminal member radially outer than the coil, as seen from the center of the core, and connecting a radially inner end of the coil as seen from the center of the core to the terminal member, that can prevent the stator from having a large size and also ensure a space for a tool for plastic deformation, a stator including that connection line, and a method of bending the connection line.

The present invention provides a plastically deformable connection line used for a stator used for an electric motor and including a hollowed, cylindrical stator core having radially inwardly projecting teeth, a coil wound on each of the teeth, and a terminal member provided at an axial end surface of the stator core radially outer than the coil, as seen from a center of the core, the connection line connecting a radially inner end of the coil, as seen from the center of the core, to the terminal member. The present connection line includes: a first bent portion provided between the radially inner end of the coil and the terminal member and bent toward the coil; and a second bent portion provided between the first bent portion and the terminal member and bent away from the coil at a position closer to the coil than the first bent portion.

According to the present invention, a connection line has a first bent portion bent toward a coil and a second bent portion bent away from the coil to connect to a terminal member a radially inner end of the coil as seen from the center of a stator core. The second bent portion is positionally closer to the coil than the first bent portion. This allows a larger distance to be provided between an end surface of the coil and the first bent portion than for example when the first bent portion is closer to the coil than the second bent portion. This ensures a space for a tool to plastically deform the connection line toward the coil. Furthermore, the second bent portion can be bent at an adjusted angle to provide the connection line closer to the coil than at least the first bent portion. This can prevent the stator from having a large size. As the second bent portion is bent away from the coil, it is not necessary to consider a distance from the second bent portion to the end surface of the coil, or the space for the tool. As a result, a connection line used for a stator used for an electric motor and including a stator core, a coil provided at the stator core's inner circumferential side, and a terminal member radially outer than the coil, as seen from the center of the core, and connecting to the terminal member a radially inner end of the coil as seen from the center of the core, is provided that can prevent the stator from having a large size and also ensure a space for a tool to plastically deform the connection line toward the coil.

Preferably, the connection line has the first bent portion and the second bent portion to have a connection portion connected to the terminal member along the terminal member in contact therewith generally parallel thereto.

According to the present invention, the connection line having the first bent portion and the second bent portion can have a connection portion connected to the terminal member along the terminal member in contact therewith generally parallel thereto. This allows the connection line and the terminal member to have their respective contact surfaces welded together to be bonded together with large strength. This allows the terminal member to be simpler in geometry and the connection line to be positioned more easily than for example when a connection line is inserted in a cylindrical terminal member and thus fixed thereto.

Still preferably, the connection line is formed integrally with a conductor forming the coil.

According to the present invention, the connection line can be implemented by a conductor forming the coil. Reduced cost can be achieved.

The present invention in another aspect provides a stator that includes the connection line according to the first invention.

According to the present invention, a stator including the connection line according to the first invention can be prevented from having a large size and also ensure a space for a tool to plastically deform the connection line.

The present invention in still another aspect provides a method of bending a plastically deformable connection line used for a stator used for an electric motor and including a hollowed, cylindrical stator core having radially inwardly projecting teeth, a coil wound on each of the teeth, and a terminal member provided at an axial end surface of the stator core radially outer than the coil, as seen from a center of the core, the connection line connecting a radially inner end of the coil, as seen from the center of the core, to the terminal member. The method includes the steps of: firstly bending the connection line extending from the radially inner end of the coil in an axial direction of the core, at a first bending position toward the terminal member; secondly bending a portion of the connection line closer to the terminal member than the first bending position to a side farther than the first bending position as seen from the coil; and thirdly bending the connection line at the first bending position toward the coil to allow the portion of the connection line bent in the step of secondly bending to be closer to the coil than the first bending position.

According to the present invention, a connection line extending from a radially inner end of a coil, as seen from the center of a core, in the core's axial direction is bent at a first bending position toward a terminal member, and a portion of the connection line closer to the terminal member than the first bending position is bent to a side farther than the first bending position as seen from the coil. This can eliminate the necessity of considering interference with the coil, the stator core, the terminal member and the like surrounding members in bending a portion of the connection line closer to the terminal member than the first bending position, and the connection line can be readily bent to have a desired angle. Furthermore, the connection line is bent at the first bending position toward the coil to be closer to the coil than the first bending position. This can prevent the stator from having a large size. Furthermore, a larger distance can be provided between an end surface of the coil and the first bent portion than for example when the first bent portion is positionally closer to the coil than the second bent portion. This ensures a space for a tool to plastically deform the connection line at the first bent portion toward the coil. As a result, a method of bending a connection line used for a stator used for an electric motor and including a stator core, a coil provided at the stator core's inner circumferential side, and a terminal member radially outer than the coil, as seen from the center of the core, and connecting to the terminal member a radially inner end of the coil as seen from the center of the core, can be provided that can prevent the stator from having a large size and also ensure a space for a tool to plastically deform the connection line toward the coil.

BEST MODES FOR CARRYING OUT THE INVENTION

Hereinafter reference will be made to the drawings to describe the present invention in embodiments. In the following description, identical components are identically denoted. Their names and functions are also identical. Accordingly, they will not be described repeatedly in detail.

Figure 1:
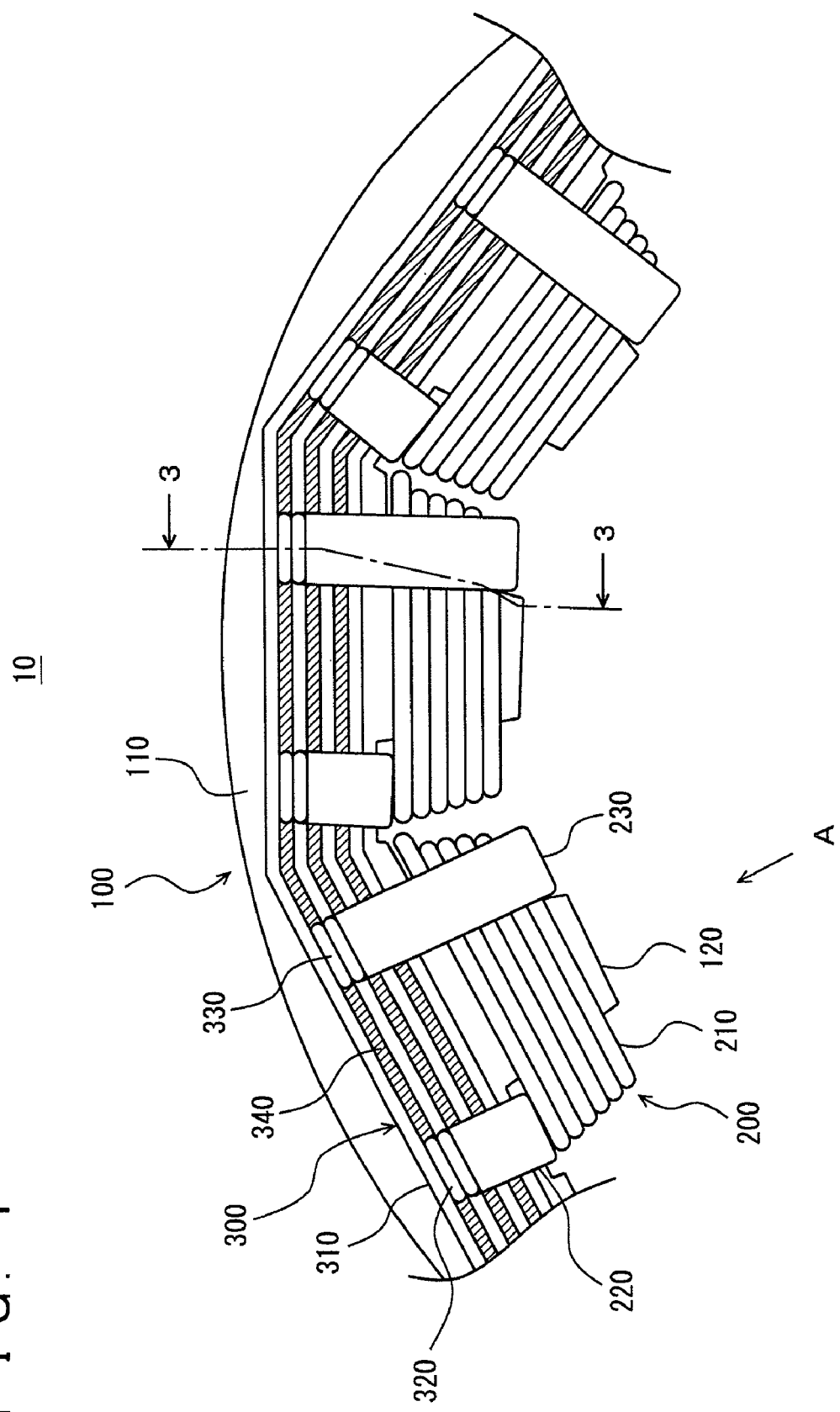
FIGS. 1, 2 show a stator in an embodiment of the present invention.
Figure 2:
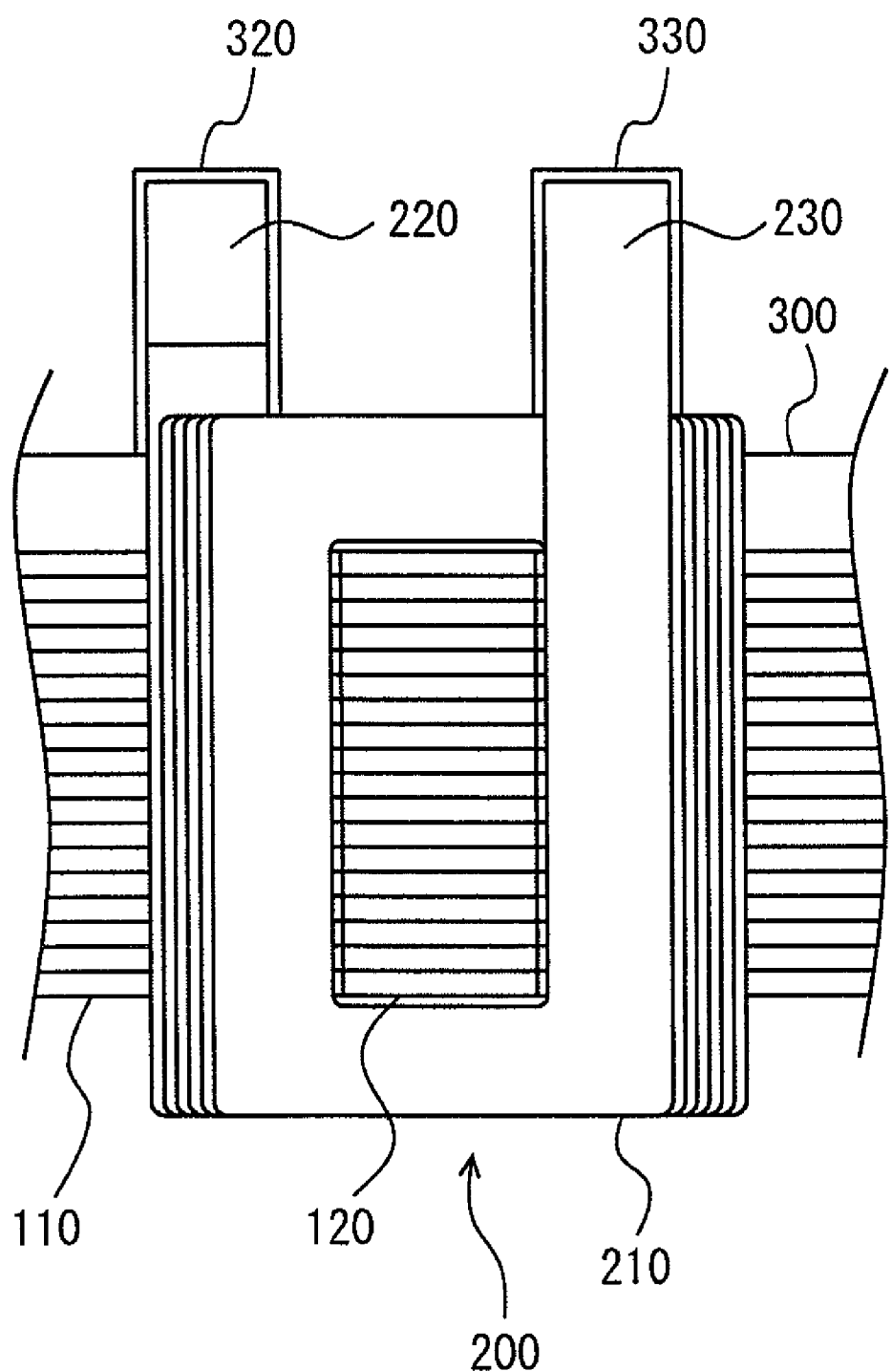

With reference to FIGS. 1, 2, the present invention in an embodiment provides a stator 10 for an electric motor. FIG. 1 is a partial plan view of stator 10, as seen downward. FIG. 2 is a partial plan view of stator 10, as seen in a direction A indicated in FIG. 1. Stator 10 includes a stator core 100, a coil 200, and a bus bar 300.

Stator core 100 is formed of a plurality of magnetic steel plates stacked in layers. Stator core 100 has a main body 110 and teeth 120. The stator's main body 110 is formed in a ring (or a hollowed cylinder) uniform in width along its entire circumference. A plurality of teeth 120 are provided on an inner circumferential surface of the stator's main body 110 with fixed intervals and each project radially inwardly of the stator's main body 110. In the following description, expressions "radially inner . . . ", "radially inward(ly)", and other similar expressions mean "closer to the center of stator core 100" and expressions "radially outer . . . ", "radially outward (ly)", and other similar expressions mean "farther from the center of stator core 100".

Coil 200 is attached to each tooth 120. Coil 200 includes a main body 210, a connection line 220 connected to a radially outer end of the coil's main body 210, and a connection line 230 connected to a radially inner end of the coil's main body 210. The coil's main body 210 and connection lines 220, 230 are integrally formed of a conductor having a longer side and a shorter side (or a longer diameter and a shorter diameter) in cross section that is plastically deformed. Note, however, that the conductor is not limited thereto in cross section. Alternatively, the coil's main body 210 and connection lines 220, 230 may be formed of separate conductors.

The coil's main body 210 is wound around an axis which corresponds to a radial direction of stator core 100, and thus formed spirally. Coil 200 is a coil wound such that the conductor as seen in cross section has a shorter side inside and a longer side perpendicular to the axis around which the coil is wound, i.e., a so called edgewise coil. Coil 200 is wound in accordance with the geometry of tooth 120 to be increased in diameter as seen radially outward from the center of the core. Note that how the conductor is wound is not limited thereto.

Connection line 220 projects upward from the radially outer end of the coil's main body 210 in an axial direction of stator core 100 and is bent at a predetermined position radially outward and connected to bus bar 300 at a terminal member 320.

Connection line 230 projects upward from the radially inner end of the coil's main body 210 in the axial direction of stator core 100 and is bent at a predetermined position radially outward and connected to bus bar 300 at a terminal member 330. Connection line 230 thus has a portion over an upper outer surface of the coil's main body 210 (hereinafter also referred to as "the coil end") along the coil end.

Bus bar 300 is provided at an upper surface of the stator's main body 110 (i.e., radially outer than coil 200). Bus bar 300 has an insulation casing 310 formed in a ring along the entire circumference of the upper surface of the stator's main body 110. Insulation casing 310 has a plurality of circumferentially extending grooves each provided with terminal member 320, 330 depending on each coil 200. Terminal members 320, 330 are each an electrically conductive elongate plate member having one end connected to a conductive member 340 provided in each groove. Terminal members 320, 330 have their respective other ends projecting upward in the axial direction of stator core 100 and welded or the like and thus bonded to connection lines 220, 230. Each coil 200 is thus electrically connected for example to another adjacent coil 200 with two coils 200 posed therebetween.

Figure 3:
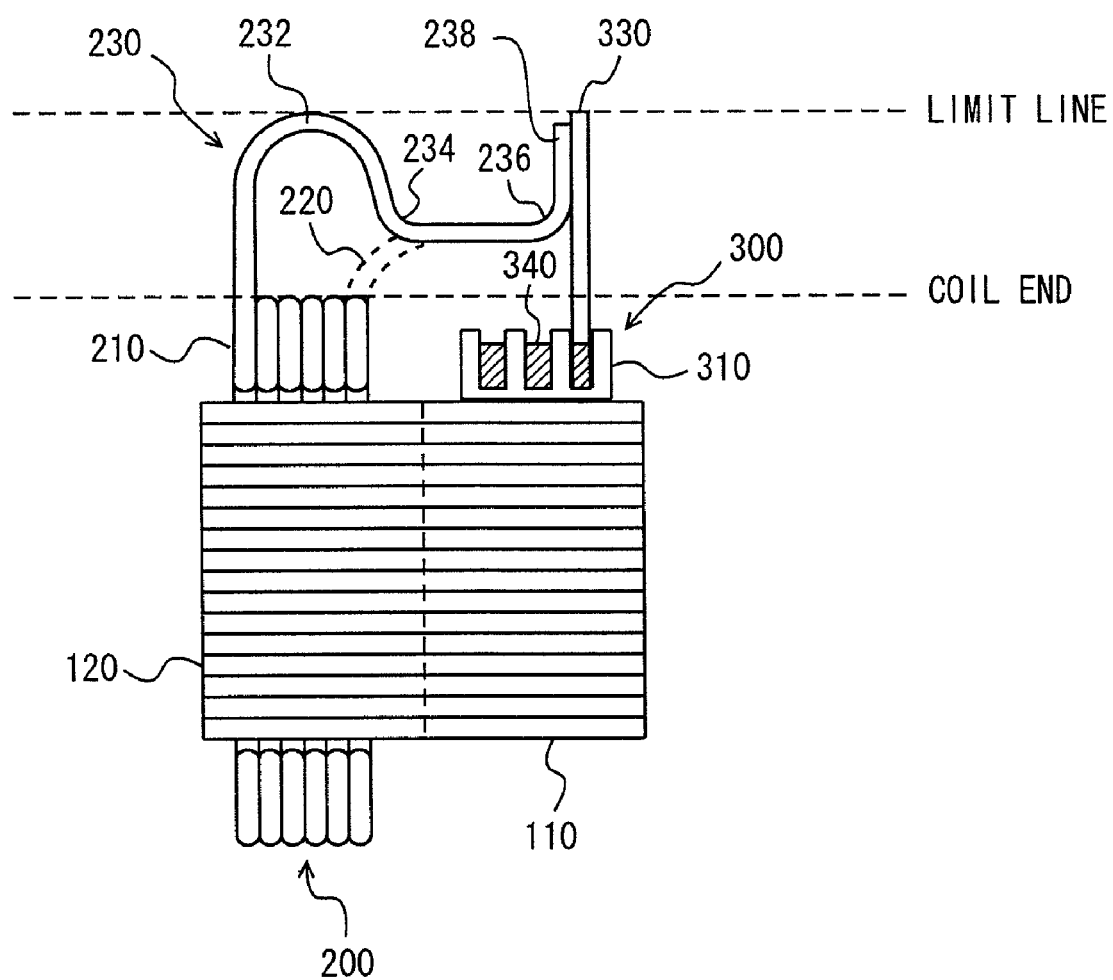
FIG. 3 shows a connection line in an embodiment of the present invention.

With reference to FIG. 3, connection line 230 in the present embodiment will be described. FIG. 3 is a cross section taken along a line 3-3 shown in FIG. 1.

Connection line 230 projects from the radially inner end of the coil's main body 210 in the axial direction of stator core 100 vertically upward.

Connection line 230 in a vicinity of an axial length limit line for stator core 100 (see FIG. 3) has a first bent portion 232 bent downward toward the coil's main body 210. The limit line is determined by a requirement for mounting stator 10.

Connection line 230 at a portion radially outer than first bent portion 232 has a second bent portion 234 at a position between the limit line and the coil end and closer to the coil's main body 210 than first bent portion 232. Second bent portion 234 is bent away from the coil's main body 210 to allow connection line 230 to extend generally horizontally rightward.

Furthermore, connection line 230 radially outer than second bent portion 234 has a third bent portion 236 in a vicinity of terminal member 330. Third bent portion 236 is bent away from the coil's main body 210 to allow connection line 230 to have a connection portion 238 connected to terminal member 330 along an end surface of terminal member 330 in contact therewith generally parallel thereto.

While the present embodiment provides a bent portion bent away from the coil's main body 210 by second bent portion 234 and third bent portion 236, second bent portion 234 and third bent portion 236 may be provided for example as a single bent portion.

Figure 4A:
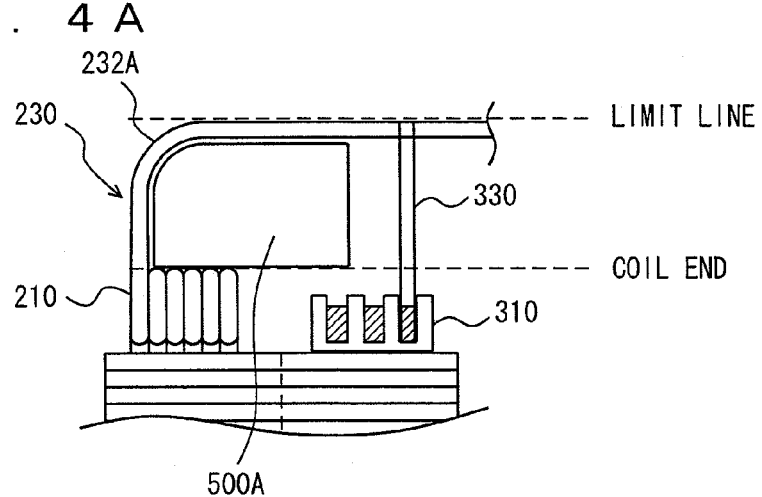
FIGS. 4A, 4B, 4C show a method of bending a connection line in an embodiment of the present invention.
Figure 4B:
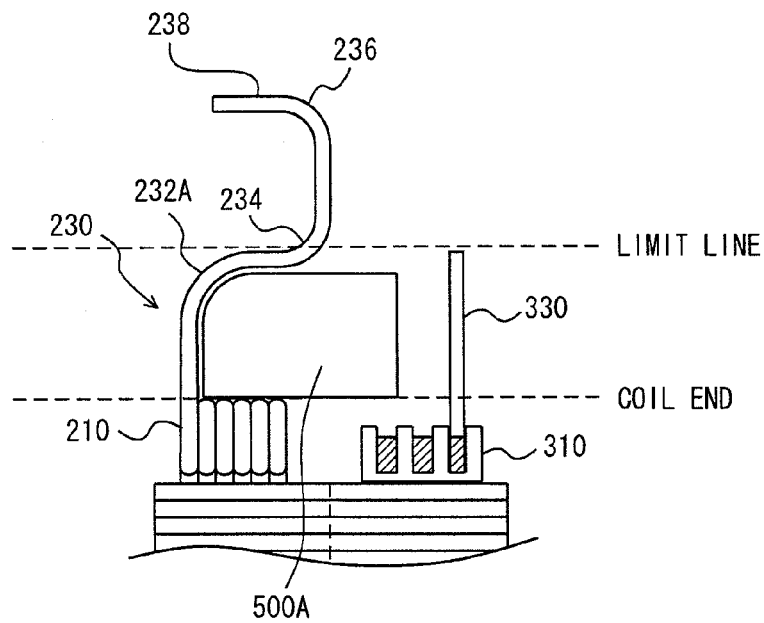
Figure 4C:
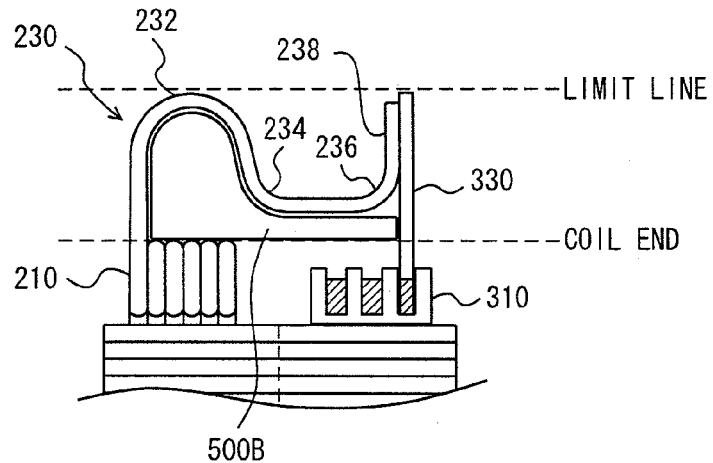

With reference to FIGS. 4A, 4B, 4C, the present embodiment provides a process for bending connection line 230, as will be described hereinafter. Initially, coil 200 is set on tooth 120. In this state, connection line 230 projects upward.

Then, as shown in FIG. 4A, a tool 500A is inserted between the coil end and the limit line for bending connection line 230 toward terminal member 330 generally horizontally. Connection line 230 is pressed against tool 500A and thus plastically deformed.

Then, as shown in FIG. 4B, connection line 230 is plastically deformed to previously form second bent portion 234 and third bent portion 236 at a side farther than a first bent portion 232A as seen from the coil's main body 210. Note that second bent portion 234 and third bent portion 236 are formed with another tool (not shown) different from tool 500A.

Furthermore, as shown in FIG. 4C, a tool 500B different from tool 500A is set between the coil end and the limit line. Connection line 230 is pressed against tool 500B and thus plastically deformed to bend first bent portion 232A at an increased angle to provide first bent portion 232. Thus, when the process for bending connection line 230 is completed, connection line 230 is not beyond the limit line and connection portion 238 is located at a position along an end surface of terminal member 330 in contact therewith parallel thereto.

In accordance with the structure and process as described above, the present embodiment provides connection line 230 and a method of bending the same having an effect, as will be described hereinafter.

Connection line 230 has first bent portion 232, second bent portion 234 and third bent portion 236. First bent portion 232 is bent over the coil end toward the coil's main body 210 to connect the radially inner end of the coil's main body 210 to terminal member 330. To form first bent portion 232, it is necessary to set tool 500A on the coil end for plastic deformation, and to plastically deform connection line 230 at a required angle, it is desirable to maximize a distance allowing tool 500A to be disposed, as seen in the axial direction of stator 10.

Accordingly, first bent portion 232 is provided in a vicinity of the limit line. This can provide a large distance between the coil end and first bent portion 232, and hence a large distance allowing tool 500A to be disposed, as seen in the axial direction of stator 10.

Furthermore, connection line 230 having first bent portion 232, second bent portion 234 and third bent portion 236 can have connection portion 238 connected to terminal member 330 along an end surface of terminal member 330 in contact therewith generally parallel thereto. This allows connection line 230 and terminal member 330 to be welded together over an increased area and thus bonded together with increased strength. This allows terminal member 330 to be simpler in geometry and connection line 230 and terminal member 330 to be positioned more easily than for example when a connection line is inserted in a cylindrical terminal member and thus fixed to enhance strength bonding them together.

Second bent portion 234 and third bent portion 236 are provided at positions, respectively, closer to the coil's main body 210 than first bent portion 232. It should be noted, however, that second bent portion 234 and third bent portion 236 are bent away from the coil's main body 210. It is thus not necessary to consider a distance between second bent portion 234 and third bent portion 236 and the coil end, as it is for first bent portion 232.

Furthermore, to bend connection line 230, connection line 230 is initially bent in a vicinity of the limit line toward terminal member 330 generally horizontally to form first bent portion 232A. Then, second bent portion 234 and third bent portion 236 are previously formed at a side farther than first bent portion 232A as seen from the coil's main body 210. This can eliminate the necessity of considering whether the coil end, stator core 100, terminal member 330 and the like surrounding members interfere with a tool in forming second bent portion 234 and third bent portion 236. This can facilitate forming second bent portion 234 and third bent portion 236.

Furthermore, connection line 230 is pressed against tool 500B to bend first bent portion 232A furthermore toward the coil's main body 210 to provide first bent portion 232 to provide connection line 230 closer to the coil's main body 210 than the limit line. Thus, when connection line 230 is completed, connection line 230 is closer to the coil's main body 210 than the limit line and stator 10 is prevented from having large size. Note that, as has been described above, first bent portion 232 is provided in a vicinity of the limit line, and a sufficient space is ensured for tool 500B.

As described above, the present embodiment provides a connection line bent toward a coil over a coil end to connect to a terminal member a radially inner end of the coil as seen from the center of the core. The connection line is bent in a vicinity of a limit line. This can provide a large distance between the coil end and the bent portion, and hence a large distance, as seen in the stator's axial direction, to allow a tool to be disposed.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

The invention claimed is:

1. A connection line used for a stator used for an electric motor and including a hollowed, cylindrical stator core having radially inwardly projecting teeth, a coil wound on each of said teeth, and a terminal member provided at an axial end surface of said stator core radially outer than said coil, as seen from a center of said core, the connection line connecting a radially inner end of said coil , as seen from the center of said core, to said terminal member, the connection line comprising:
- a first bent portion provided between said radially inner end of said coil and said terminal member and bent toward said coil;
- a second bent portion provided between said first bent portion and said terminal member and bent away from said coil at a position closer to said coil than said first bent portion to provide said connection line with a recess recessed in a direction approaching said axial end surface of said stator core; and
- a connection portion provided at a position between said second bent portion and said terminal member and remoter from said axial end surface of said stator core than said second bent portion , and connected to said terminal member.

2. The connection line according to claim 1, wherein
said terminal member extends in a direction generally parallel to an axial direction of said stator core; and
said connection portion overlaps said terminal member generally parallel thereto, with their respective ends both directed away from said axial end surface of said stator core, and is thus connected to said terminal member.

3. The connection line according to claim 1, wherein the connection line is formed integrally with a conductor forming said coil.

4. A stator comprising the connection line according to claim 1.

5. A method of bending a connection line used for a stator including a hollowed, cylindrical stator core having radially inwardly projecting teeth, a coil wound on each of said teeth, and a terminal member provided at an axial end surface of said stator core radially outer than said coil, as seen from a center of said core, said connection line connecting a radially inner end of said coil, as seen from the center of said core, to said terminal member, the method comprising the steps of:
- firstly bending said connection line extending from said radially inner end of said coil in an axial direction of said core, at a first bending position toward said terminal member;
- secondly bending a portion of said connection line closer to said terminal member than said first bending position to a side farther than said first bending position as seen from said coil in a form of a recess; and
- thirdly bending said connection line at said first bending position toward said coil to allow said portion of said connection line bent in said form of said recess in the step of secondly bending to be closer to said coil than said first bending position to recess said connection line in a direction approaching said axial end surface of said stator core and also connect said connection line to said terminal member at a position between said portion of said connection line bent in said form of said recess in the step of secondly bending and said terminal member and remoter from said axial end surface of said stator core than said portion of said connection line bent in said form of said recess in the step of secondly bending.

* * * * *